(No Model.) 2 Sheets—Sheet 1.

T. J. CLOSE.
COUPLING.

No. 539,796. Patented May 28, 1895.

Witnesses.
Jesse B. Heller.
Chas. C. Collier.

Inventor.
Thomas J. Close,
by Chas. B. Collier,
Attorney.

(No Model.) 2 Sheets—Sheet 2.

T. J. CLOSE.
COUPLING.

No. 539,796. Patented May 28, 1895.

Witnesses.
Jesse B. Heller.
Chas. C. Collier.

Inventor.
Thomas J. Close,
by Chas. B. Collier,
Attorney.

UNITED STATES PATENT OFFICE.

THOMAS J. CLOSE, OF PHILADELPHIA, PENNSYLVANIA.

COUPLING.

SPECIFICATION forming part of Letters Patent No. 539,796, dated May 28, 1895.

Application filed July 10, 1894. Serial No. 517,052. (No model.)

*To all whom it may concern:*

Be it known that I, THOMAS J. CLOSE, a citizen of the United States, residing at the city of Philadelphia, in the county of Philadelphia and State of Pennsylvania, have invented a new and improved coupling designed and intended especially to couple or connect sections of rods or tubes employed for drawing or pushing electric wires and cables in and through underground conduits, of which invention the following is a full, clear, and exact description, reference being had to the annexed drawings, forming part hereof.

It is customary for the purpose of inserting cables in underground conduits, or ducts, to employ a "pilot-wire" by means of which the cable is drawn into the conduit; and to insert the "pilot-wire," tubes, or rods, built up in sections, have been employed, such sections being united or joined together in some suitable manner. I am aware of the employment for this purpose of sections of tubing and of solid rods connected together by coupling devices, but couplers heretofore employed for this purpose are subject to objections which it is the aim and object of my invention to avoid.

Figure 1:
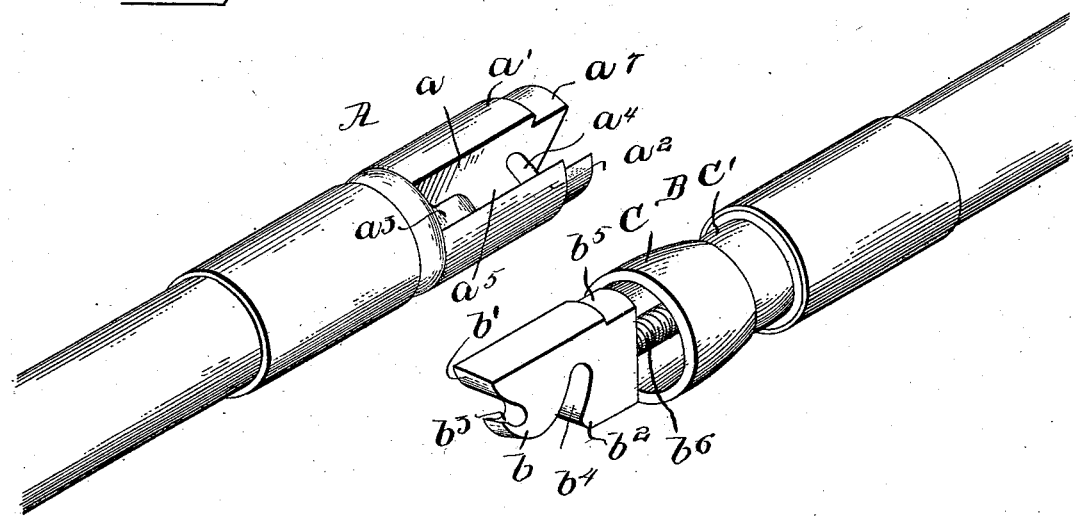
Figure 2:
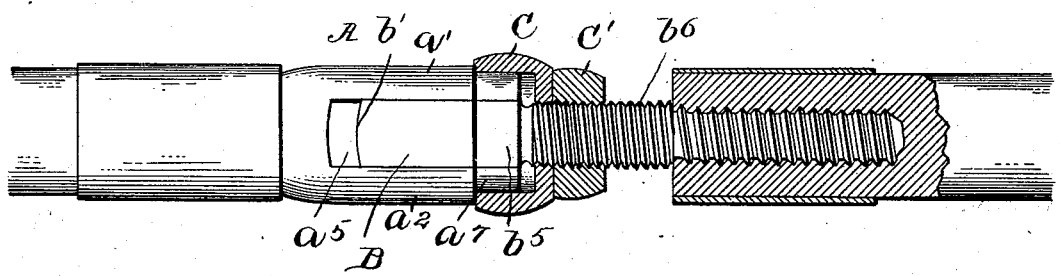
Figure 3:
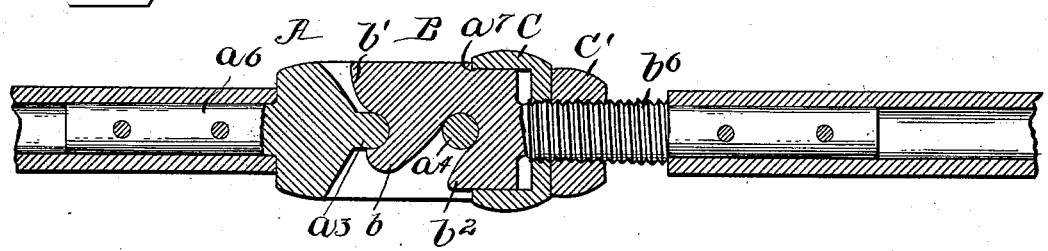
Figure 4:
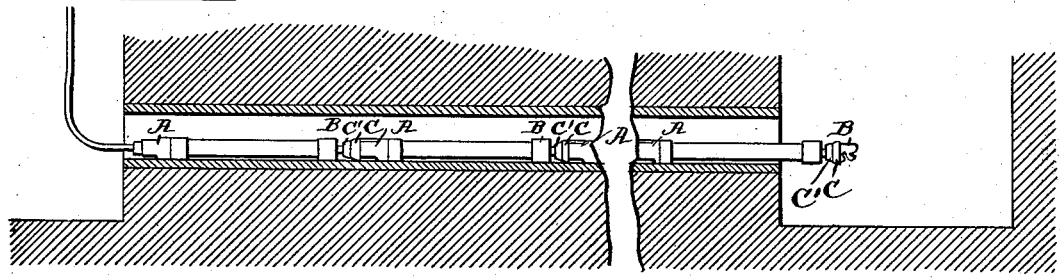
Figure 5:
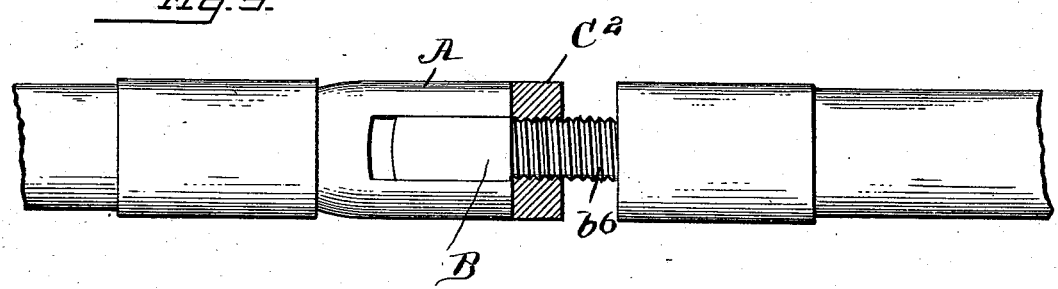

In the accompanying drawings, Figure 1 represents, in perspective, the two parts of my coupling, usually termed the male and female parts, respectively; Fig. 2, the parts united; Fig. 3, the same as attached at its opposite ends to the ends of rods or tubes. Fig. 4 is a rod broken in sections and having the wire or cable intended to be drawn through the conduit attached to the end of one of the sections; Fig. 5, a modification, not of the coupler proper, but of the screw-nut exhibited in the other figures.

A, is the female part of the coupling and B the male part. The part A is recessed, as shown at $a$, so as to leave, or provide, two side-bars $a'$ $a^2$ and cross-bars $a^3$ $a^4$ with opening $a^5$ and has a stem $a^6$. The side-bars are, preferably, reduced in area in cross-section, as shown at $a^7$ for a purpose hereinafter explained.

The part B is provided with tongues $b$ $b'$ $b^2$, intervening recesses $b^3$ $b^4$, and is, preferably, reduced in cross-section as shown at $b^5$ to correspond with the reduced area of the side-bars of part A. Part B is also provided with a stem $b^6$ threaded throughout part of its length, or it may be threaded throughout its entire length, but this is not essential, depending on the manner that may be preferred of attaching or connecting the stem of the coupling to the section of a rod.

C is a threaded nut of the type known as "cup-nuts" and C' a threaded jam, or guard, nut, both of said nuts being adapted to engage with threaded stem $b^6$ and it is preferable that the thread on that part of the stem $b^6$ engaged by C' shall be the reverse of that engaged by C.

The ends of the two parts of the coupling may be connected to the sections of the rods, whether the latter are tubular or solid, in any manner that may be preferred or desired.

The manner of connecting, or interlocking, the parts A and B will be readily understood, namely: The tongue $b$ is passed through opening $a^5$ and engages with the lower surface of cross-bar $a^3$ while tongue $b'$ engages with the upper surface thereof, and tongue $b^2$ engages with cross bar $a^4$ thereby effectually interlocking the parts. The "cup-nut" C and guard-nut C' being then screwed to position and the sections of the rods attached to the stems of the device, results in a combined rod which is not only effectually secured against tensile and pushing strains, but which is equally secured from "buckling" and this latter tendency is one incident to all other devices for this purpose that I am familiar with.

It will be observed, as already stated, that nut C is of the construction commonly termed "cup-nuts" whereby it is adapted to telescope the reduced ends of parts A and B while at the same time when screwed to position it bears against the end of part A.

In Fig. 5, is shown a modification of the device wherein the area of the side bars $a'$ and $a^2$ is not reduced, and the screw-nut does not telescope the same, and an ordinary threaded nut $C^2$ is employed and applied to the stem of part B which in such case is, of course, threaded. The nut, in such modification, being screwed home until it abuts against the ends of part A, will serve to prevent the disengagement and prevent the "buckling" of parts A and B in all ordinary use.

Having now described my invention, what I claim as new, and desire to secure by Letters Patent, is—

1. In a joint or coupling-device designed for the insertion of wires and cables in and through conduits, and the like, in combination with two or more sections of a rod or tube, the parts A and B, respectively, the part A having a recess, $a$, side bars $a'$, $a^2$ cross-bars $a^3$ $a^4$ and opening $a^5$ and the part B, being provided with tongues $b, b'$ $b^2$, recesses $b^3$, $b^4$, said parts A and B being adapted to interlock with each other substantially as described.

2. In a joint or coupling-device for the insertion of wires and cables in and through conduits, and the like, in combination with two or more sections of a rod or tube, the parts A and B, respectively, the part A having side-bars $a'$, $a^2$, cross-bars $a^3$, $a^4$, and opening $a^5$, said side-bars being reduced in area at their outer ends, $a^7$; the part B being provided with tongues $b, b'$, $b^2$, recesses $b^3, b^4$ and being reduced in area, as at $b^5$ and having a threaded stem $b^6$ and being provided with cup-nut C adapted to engage with said threaded stem and telescope the ends of parts A and B substantially as described.

3. In a joint or coupling-device designed for the insertion of wires and cables in and through conduits, and the like, in combination with two or more sections of a rod or tube the parts A and B, the part A being recessed as at $a$ so as to provide side bars $a'$, $a^2$, cross-bars $a^3$, $a^4$ and opening $a^5$; the part B being provided with tongues $b, b'$ $b^2$, recesses $b^3$ $b^4$ threaded stem $b^6$ and nut $C^2$, combined and arranged substantially as described.

THOMAS J. CLOSE.

Witnesses:
ANDREW ZANE,
CHAS. C. COLLIER.